No. 658,843. Patented Oct. 2, 1900.
N. HEID.
GRAIN SEPARATOR.
(Application filed June 10, 1899.)
(No Model.) 2 Sheets—Sheet 1.
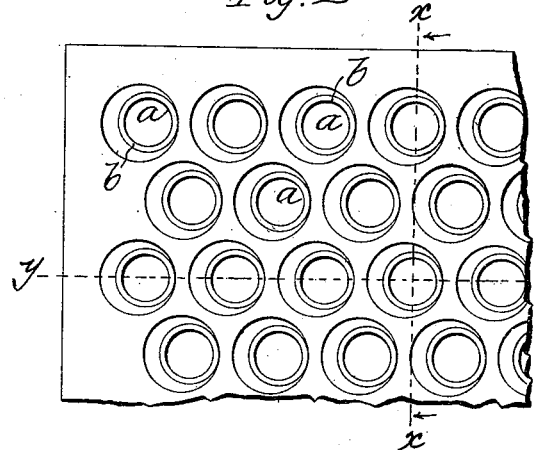
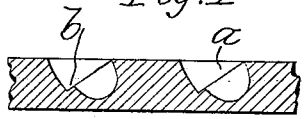
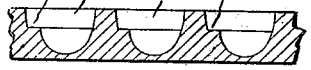
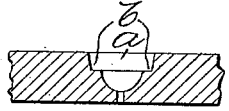
Witnesses:
Inventor,
Nicolaus Heid,
by
Atty.

No. 658,843. Patented Oct. 2, 1900.
N. HEID.
GRAIN SEPARATOR.
(Application filed June 10, 1899.)
(No Model.) 2 Sheets—Sheet 2.
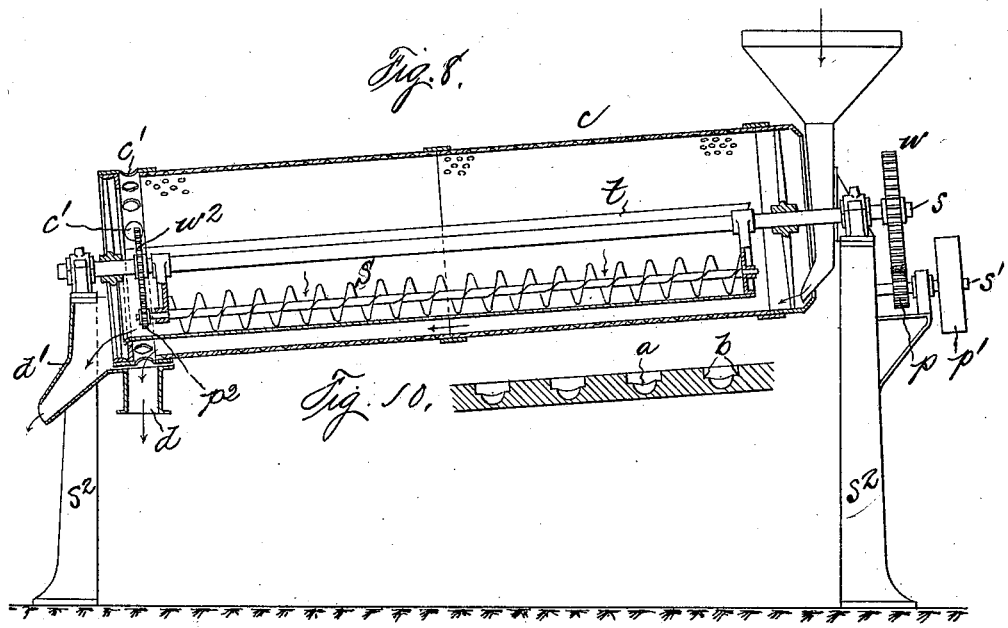
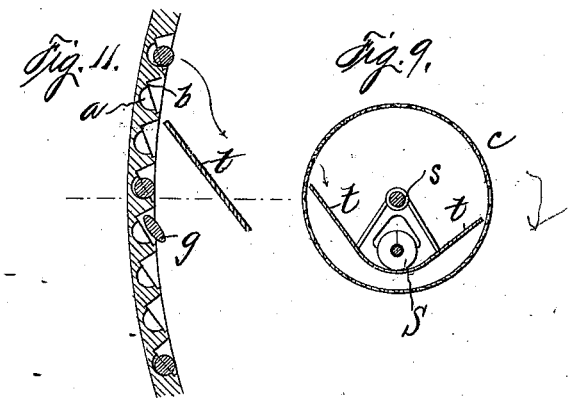
Witnesses
Inventor
Nicolaus Heid.

UNITED STATES PATENT OFFICE.

NICOLAUS HEID, OF STOCKERAU, AUSTRIA-HUNGARY.

GRAIN-SEPARATOR.

SPECIFICATION forming part of Letters Patent No. 658,843, dated October 2, 1900.

Application filed June 10, 1899. Serial No. 720,067. (No model.)

*To all whom it may concern:*

Be it known that I, NICOLAUS HEID, a subject of the Emperor of Germany, residing at Stockerau, near Vienna, in the Province of Lower Austria, in the Empire of Austria-Hungary, have invented certain new and useful Improvements in Grain-Separators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

For the separation of both the lenticular and the globular seeds of weeds from grain there has hitherto been employed either a sorting-cylinder having only large recesses or cells for the reception of such seeds or having large cells in the upper part of the cylinder and smaller cells in the lower part, or two cylinders are employed, of which the one has large cells and the other smaller cells. The cylinder with large cells has the disadvantage that many good and useful seeds of cereals or grain are also taken up by the cells, thus causing a loss in the yield. The cylinder with two kinds of cells has in addition the disadvantage of a more limited production, and the use of two cylinders having different-sized cells causes, in addition to the increased cost, double the expenditure of time for effecting the purification of the grain from the seeds of weeds, as the grain has to be fed in twice.

The present invention relates to the construction of a separating or sorting plate, the cells of which are formed with stepped walls, by which means the above-described disadvantages are obviated.

The accompanying drawings show, by way of example, some forms of separating or sorting plates constructed according to my said invention.

Figure 1 is a plan view of a portion of a grain-separating plate before being bent for use in the construction of the separating-cylinder. Figs. 2 and 3 are sections taken, respectively, on lines $xx$ and $yy$ of Fig. 1. Figs. 4 to 7 are sections of portions of such plates, illustrating a modification in configuration or arrangement of the enlarged portion of the recesses or pockets relatively to the smaller portion thereof. Fig. 8 is a vertical longitudinal section of a grain-separator embodying my invention. Fig. 9 is a cross-section of the separating-cylinder. Fig. 10 is a fragmentary longitudinal section, and Fig. 11 a similar cross-section, of said separating-cylinder, the latter having pockets such as shown to an enlarged scale in said Figs. 9 and 10 and in Figs. 1, 2, and 3.

The cells $a$, which in the form shown in the drawings may be produced either by a cutting or stamping operation or by any suitable known means, have their walls formed with a step or offset $b$, extending right around, Figs. 1, 3, 6, and 7, or flattening at one side, so as to be on a level with the wall-surface of the cell, Fig. 5, in such a manner that at this point the upper part of the cell will terminate with the lower part of the same in the shape of a perpendicular edge. Owing to this step or offset the upper part of the cell will have a greater width than the hemispherical lower part of the cell. By this means the small globular seeds of weeds are taken up and retained in the smaller part of the cells, while the larger upper part serves to take up the larger lenticular-shaped seeds, which could not be retained by cells of the usual diameter for retaining the small globular seeds. Small, but good, cereal seeds can only enter the enlarged part of the cells, so that on the rotation of the cylinder they will fall out of the cells again before they have been raised to the height at which the channel is situated for receiving the seeds of weeds, as shown at $g$, Fig. 11. The lenticular seeds of weeds are, on the other hand, sufficiently retained in the enlarged part of the cells to cause them to be carried up to above the said discharge-channel. The small depth of the part of the cell above the offset prevents these larger seeds from becoming lodged too firmly in the cells, so that a choking of the cells will not take place.

As shown at Fig. 4, the offset $b$ can also be so formed that its inner edge touches at a point the inner surface of the separating-plate. Instead of forming the cells with their axes inclined to the surface of the plate their axes may also be made perpendicular thereto, as shown at Figs. 5 and 7. Fig. 7, as well as Fig. 6, further shows that the plate may also be perforated in the direction of the axes of the cells.

In Fig. 8 I have shown a grain-separator the separating-cylinder $c$ of which is constructed of plates having pockets such as shown in Figs. 1, 2, and 3. The cylinder is mounted on and revolves with a shaft $s$, that carries a gear-wheel $w$, meshing with a pinion $p$ on a stud or short shaft $s'$, that carries the belt-pulley $p'$, belted to any suitable prime motor. The shaft $s$ is mounted and revolves in bearings on standards $s^2$ at an angle to the horizontal, the grain being fed to the cylinder from a feed-hopper $h$, the spout of which projects through the open cylinder-head at its higher or elevated end to deliver the grain to said cylinder at a point below the seed-collector or trough $t$, which is suspended from hangers loosely mounted on shaft $s$, said hangers having bearings for a screw-conveyer S, carrying at its lower or outer end a pinion $p^2$ in gear with a toothed wheel $w^2$, fast on shaft $s$. At its lower or outer end the cylinder $c$ is provided with numerous large discharge-openings $c'$, through which the separated grain passes into the discharge-spout $d$, while the cockle and other undesirable smaller seed is forwarded by the conveyer S through the lower head of the separator-cylinder to the discharge-spout $d'$.

I claim—

1. A grain-separating cylinder constructed of plates having seed-pockets, each pocket being of different cross-sectional areas and having an offset between the inner portion of greater area and the other portion, for the purpose set forth.

2. A grain-separating cylinder constructed of plates having seed-pockets, each pocket being of different cross-sectional areas, and having an offset between the outer portion of least area and the inner portion, the latter having its wall inclined to the surface of the plate in the direction of rotation of the cylinder, for the purpose set forth.

3. A grain-separating cylinder, constructed of plates having pockets, each pocket being of different cross-sectional areas, the inner circular portion thereof being of greater area and eccentric to the outer hemispherical portion, for the purpose set forth.

4. A grain-separating cylinder, constructed of plates having pockets, each pocket being of different cross-sectional areas, and having the inner circular portion of greater area and eccentric to the outer hemispherical portion, and an offset between said circular and hemispherical portions, substantially as and for the purpose set forth.

In testimony that I claim the foregoing as my invention I have signed my name in presence of two subscribing witnesses.

NICOLAUS HEID.

Witnesses:
YOSEF RUBARCH,
ALVESTO S. HOGUE.